United States Patent
Tran

[19]

[11] Patent Number: 5,919,251
[45] Date of Patent: Jul. 6, 1999

[54] SEARCH MECHANISM FOR A ROTATING POINTER BUFFER

[75] Inventor: Thang M. Tran, Austin, Tex.

[73] Assignee: Advanced Micro Devices, Inc., Sunnyvale, Calif.

[21] Appl. No.: 08/962,810

[22] Filed: Nov. 3, 1997

[51] Int. Cl.[6] .................................................. G06F 12/00
[52] U.S. Cl. ...................... 710/52; 711/137; 395/800.26
[58] Field of Search ........................ 710/52–57; 711/137; 365/189.01, 189.12; 395/394, 800.26, 800.27

[56] References Cited

U.S. PATENT DOCUMENTS

| | | | |
|---|---|---|---|
| 5,537,552 | 7/1996 | Ogasawara et al. ..................... | 395/877 |
| 5,584,037 | 12/1996 | Papworth et al. .................. | 395/800.23 |
| 5,586,295 | 12/1996 | Tran ......................................... | 711/137 |
| 5,778,245 | 7/1998 | Papworth et al. .................. | 395/800.23 |
| 5,829,028 | 10/1998 | Lynch et al. ............................. | 711/126 |
| 5,878,244 | 3/1999 | Witt et al. ................................ | 395/394 |

*Primary Examiner*—Christopher B. Shin
*Attorney, Agent, or Firm*—Conley, Rose & Tayon; Lawrence J. Merkel; B. Noel Kivlin

[57] ABSTRACT

A first hit scanning circuit scans hit signals identifying entries within a rotating buffer which are storing a search value for a first of the hit signals which is nearest a start pointer which identifies one of the entries. The first hit scanning circuit divides the hit signals into multiple subsets, and independently scans each subset for a first hit within the subset. In parallel, the first hit scanning circuit generates a set of lookahead signals by scanning each subset for at least one hit. The lookahead signals are then scanned for a first lookahead signal, and the scanned subset signals are qualified with the scanned lookahead signals.

18 Claims, 10 Drawing Sheets

| | | |
|---|---|---|
| 62 | Start Pointer | 01110 |
| 64 | Raw Hits | 0000 1100 0011 1000 0000 1100 1111 0101 |
| 66 | Below Hits | 0000 0000 0000 0000 0000 1100 1111 0101 |
| 68 | Above Hits | 0000 1100 0011 1000 0000 1100 1111 0101 |
| 70 | Below Lookahead | 0000 0111 |
| 72 | Above Lookahead | 0111 0111 |
| 74 | Scanned Below Lookahead | 0000 0100 |
| 76 | Scanned Above Lookahead | 0100 0100 |
| 78 | Scanned Below Hits | 0000 0000 0000 0000 0000 1000 1000 0100 |
| 80 | Scanned Above Hits | 0000 1000 0010 1000 0000 1000 1000 0100 |
| 82 | Qualified Below Hits | 0000 0000 0000 0000 0000 1000 0000 0000 |
| 84 | Qualified Above Hits | 0000 1000 0000 0000 0000 1000 0000 0000 |
| 86 | First Hit | 0000 0000 0000 0000 0000 1000 0000 0000 |

SEARCH MECHANISM FOR A ROTATING POINTER BUFFER

BACKGROUND OF THE INVENTION

1. Field of the Invention

This invention is related to the field of integrated circuits and, more particularly, to a rotating pointer buffer often included in integrated circuits.

2. Description of the Related Art

Integrated circuits of various types use buffers to store values in an ordered fashion. The order of the values is typically the order in which the values are stored into the buffer over time. For example, a first-in, first-out (FIFO) buffer orders values as they are stored into the FIFO buffer. Values are removed from the FIFO buffer in the same order in which they were stored in the buffer. FIFO buffers may be used in a modified fashion in which values may be removed from within the buffer (instead of only the oldest value, which is at the "bottom" of the buffer), but generally older values (values which were stored in the buffer earlier in time than other values within the buffer) are favored for selection over newer values (values which were stored in the buffer later in time than other values within the buffer).

FIFO buffers may have many different uses in integrated circuits (such as microprocessors). For example, a microprocessor may implement a reorder buffer as a FIFO buffer. A load/store buffer or a reservation station may be a FIFO type buffer in which values may be removed from entries within the buffer as well as from the "bottom" entry (i.e. the entry storing the oldest value). Generally, a buffer includes multiple entries of equal size. Each of the entries is configured to store a value.

FIFO buffers may physically be implemented in a number of ways. Two often used implementations are the shifting structure and the rotating pointer buffer. In the shifting structure, one entry within the buffer is permanently assigned to be the "bottom" entry in the buffer. A value being stored into the buffer is stored into the entry which is nearest the bottom entry and which is currently empty. As values are removed from the bottom entry in the buffer, values stored in other entries within the buffer are shifted down such that the bottom entry is filled with the oldest remaining value and other entries nearest the bottom are filled with the remaining values.

Alternatively, the rotating pointer buffer does not shift values from entry to entry. A value stored into a particular entry in the rotating pointer buffer remains in the particular lo entry until the value is removed from the buffer. A head pointer is used to indicate the "bottom" entry, and a tail pointer is used to indicate the entry into which new values are to be stored. Deleting a value from the buffer is accomplished by modifying the head pointer, and adding a value to the buffer is accomplished by storing the value into the entry indicated by the tail pointer and modifying the tail pointer. Rotating pointer buffers may also be referred to as "circular buffers".

Table 1 below lists various attributes of rotating pointer buffers and shifting structures, as well as an indication of which implementation is superior with regard to each attribute. The number of entries in the buffer is N.

TABLE 1

Comparison of Rotating Pointer Buffer to Shifting Structure

| | Rotating Pointer | Shifting Structure | Superior |
| --- | --- | --- | --- |
| Area | Latch | Flip Flop and Mux | Rotating Pointer |
| Input Value Write | Direct (Tail Pointer) | Extra Mux Input | Rotating Pointer |
| Bottom Read | N:1 Mux | Direct | Shifting Structure |
| Any Entry Read | N:1 Mux | N:1 Mux | equal |
| Scan First Hit | 2 * N entry scan | N entry scan | Shifting Structure |
| Next Cycle R/W | Direct (Tail Pointer) | Extra Mux Input | Rotating Pointer |
| Unique Entry Hit | Direct | Direct | equal |

As Table 1 illustrates, the rotating pointer structure is superior to or equal to the shifting structure (in terms of complexity, lowest area consumption, and speed) in each of the attributes except for the bottom entry read and the scan for the first hit. The bottom entry read may often times by a non-critical path (i.e. it may be slow without affecting clock cycle time). However, the scan for the first hit (in which a search value is being searched for in the buffer and a particular one of multiple possible matches, or hits, is desired) is more complex and slower in the rotating pointer buffer than in the shifting structure. In the shifting structure, a scan of the N entries is performed (since the order of the entries is based upon physical position in the buffer). In the rotating pointer buffer, effectively two scans of the N entries are performed. One of the scans masks results from the entries between a start pointer indicating where the scan is to be initiated and one end of the buffer, and the other of the scans masks results from the entries between the start pointer and the other end of the buffer. These two scans are then merged to produce a scan result.

Many approaches to scanning for the first hit lead to a large fanout and heavy loading on various signals within the scanning circuitry. Generally, each possible hit is qualified with the lack of any previous hits, masked according to the entry at which searching is initiated. An efficient method for scanning for the first hit in a rotating pointer buffer is therefore desired, to improve the advantages of the rotating pointer buffer implementation over that of the shifting structure.

SUMMARY OF THE INVENTION

The problems outlined above are in large part solved by a first hit scanning circuit in accordance with the present invention. The first hit scanning circuit scans hit signals identifying entries within a rotating buffer which are storing a search value for a first of the hit signals which is nearest a start pointer which identifies one of the entries. The first hit scanning circuit divides the hit signals into multiple subsets, and independently scans each subset for a first hit within the subset. In parallel, the first hit scanning circuit generates a set of lookahead signals by scanning each subset for at least one hit. The lookahead signals are then scanned for a first lookahead signal, and the scanned subset signals are qualified with the scanned lookahead signals. Advantageously, loading is light throughout the first hit scanning circuit. The circuit may be operable at high frequency, allowing for a rotating pointer buffer to be used.

Broadly speaking, the present invention contemplates a method for identifying a first entry within a rotating pointer buffer comprising a set of entries. The first entry stores a search value. Responsive to a start pointer indicative of a particular entry within the rotating pointer buffer at which searching for the search value is initiated, a set of comparison signals corresponding to the set of entries is masked to generate a first masked set of comparison signals. Each of the set of comparison signals indicates, in a hit state, that a corresponding one of the set of entries is storing the search value. Conversely, each of the set of comparison signals is indicative, in a miss state, that the corresponding one of the set of entries is not storing the search value. Each of the first masked set of comparison signals for which the corresponding one of the set of entries is between the start pointer and a first end of the rotating pointer buffer is set to a miss state. Each of multiple subsets of the first masked set of comparison signals is independently scanned to generate a first set of scan values. Each of the first set of scan values corresponds to a different one of the multiple subsets of the first masked set of comparison signals. Additionally, each of the first set of scan values indicates a particular one of the first masked set of comparison signals within the different one of the multiple subsets of the first masked set of comparison signals which is in the hit state. A first set of lookahead signals is generated, wherein each one of the first set of lookahead signals corresponds to a different one of the multiple subsets of the first masked set of comparison signals. Furthermore, each one of the first set of lookahead signals is indicative, in a first state, that at least one of the first masked set of comparison signals within the different one of the multiple subsets of the first masked set of comparison signals is in the hit state. Conversely, each one of the first set of lookahead signals is indicative, in a second state, that each one of the first masked set of comparison signals within the different one of the multiple subsets of the first masked set of comparison signals is in the miss state. The first set of lookahead signals is scanned to generate a second set of scan values, wherein each of the second set of scan values indicates a particular one of a corresponding subset of the first set of lookahead signals which is in the first state. The first set of scan values are qualified with the second set of scan values to generate a third set of scan values. The second set of scan values is scanned to select a first one of the subsets of the first set of lookahead signals for which a corresponding one of the second set of scan values indicates at least one of the corresponding one of the subsets of the first set of the lookahead signals is in the first state. An output value is selected from the third set of scan values in response to the scanning the second set of scan values, thereby identifying the first entry.

The present invention further contemplates a circuit for identifying a first entry within a rotating pointer buffer comprising a set of entries. The first entry stores a search value, and the circuit comprises a mask circuit. The mask circuit is coupled to receive: (i) a set of comparison signals corresponding to the set of entries, wherein each of the set of comparison signals, in a hit state, indicates that a corresponding one of the set of entries is storing the search value, and wherein each of the set of comparison signals, in a miss state, indicates that the corresponding one of the set of entries is not storing the search value; and (ii) a start pointer indicating a particular one of the set of entries at which searching for the search value is initiated. The mask circuit is configured to generate a first masked set of comparison signals from the set of comparison signals. Each of the first masked set of comparison signals for which the corresponding one of the set of entries is between the start pointer and a first end of the rotating pointer buffer is set to a miss state.

The mask circuit is also configured to generate a second masked set of comparison signals from the set of comparison signals. The circuit further comprises a first set of scan circuits, wherein each of the first set of scan circuits is coupled to receive a different subset of the first masked set of comparison signals. Each of the first set of scan circuits is configured to scan the different subset of the first masked set of comparison signals to generate one of a first set of scan values indicating a first one of the subset of the first masked set of comparison signals which is in the hit state. The circuit still further comprises a second set of scan circuits, wherein each of the second set of scan circuits is coupled to receive a different subset of the second masked set of comparison signals. Each of the second set of scan circuits is configured to scan the different subset of the second masked set of comparison signals to generate one of a second set of scan values indicating a first one of the subset of the second masked set of comparison signals which is in the hit state. Coupled to receive the first masked set of comparison signals and the second masked set of comparison signals, a lookahead generator is included in the circuit. The lookahead generator is configured to generate a first set of lookahead signals, wherein each of the first set of lookahead signals corresponds to a different one of the subsets of the first masked set of comparison signals. Each of the first set of lookahead signals is indicative, in a first state, that at least one of the first masked set of comparison signals within the different one of the subsets of the first masked set of comparison signals is in the hit state. Each one of the first set of lookahead signals is indicative, in a second state, that each one of the first masked set of comparison signals within the different one of the subsets of the first masked set of comparison signals is in the miss state. The lookahead generator is further configured to generate a second set of lookahead signals, wherein each of the second set of lookahead signals corresponds to a different one of the subsets of the second masked set of comparison signals. Each of the second set of lookahead signals is indicative, in the first state, that at least one of the second masked set of comparison signals within the different one of the subsets of the second masked set of comparison signals is in the hit state. Furthermore, each one of the second set of lookahead signals is indicative, in the second state, that each one of the second masked set of comparison signals within the different one of the subsets of the second masked set of comparison signals is in the miss state. The circuit further comprises a third set of scan circuits, each of which is coupled to receive a different subset of the first set of lookahead signals, wherein the third set of scan circuits is configured to generate a third set of scan values. Each of the third set of scan values indicates a first one of the different subset of the first set of lookahead signals which is in the first state. A fourth set of scan circuits is included in the circuit, wherein each of the fourth set of scan circuits is coupled to receive a different subset of the second set of lookahead signals, wherein the fourth set of scan circuits is configured to generate a fourth set of scan values. Each of the fourth set of scan values indicates a first one of the different subset of the second set of lookahead signals which is in the first state. Coupled to receive the first set of scan values, the second set of scan values, the third set of scan values, and the fourth set of scan values, a lookahead qualifying circuit is configured to qualify the first set of scan values with the third set of scan values to produce a fifth set of scan values and to qualify the second set of scan values with the fourth set of scan values to produce a sixth set of scan values. The lookahead qualifying circuit is included in the circuit as well. Still further, the circuit comprises a final scan circuit coupled to receive the first set of lookahead signals and the second set of lookahead signals. The final scan circuit is configured to scan the first set of lookahead signals to identify a first one of the first set of lookahead signals which is in the first state, and further configured to scan the second set of lookahead signals to identify a first one of the second set of lookahead signals which is in the first state if none of the first set of lookahead signals are in the first state. The final scan circuit is configured to select from the fifth set of scan values and the sixth set of scan values responsive to the scanning of the first set of lookahead signals and the second set of lookahead signals.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
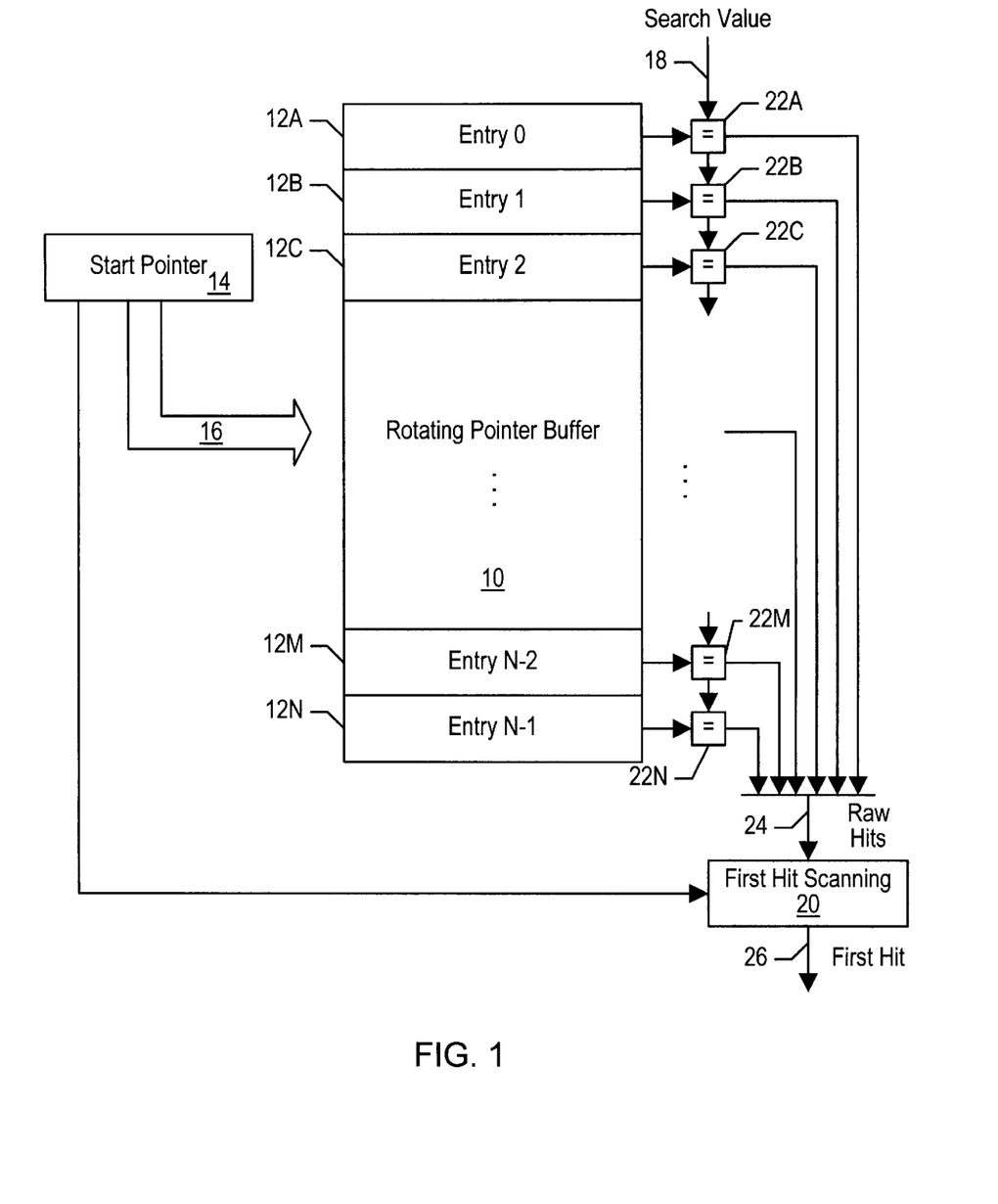
FIG. 1 is a block diagram of one embodiment of a rotating pointer buffer including a first hit scanning circuit.

Turning now to FIG. 1, a block diagram of one embodiment of a rotating pointer buffer 10 and supporting circuitry for scanning for a first hit (i.e. a first entry within rotating pointer buffer 10 which is storing a search value provided to rotating pointer buffer 10) is shown. Other embodiments are possible and contemplated. Rotating pointer buffer 10 includes N entries 12A–12N (numbered entry 0 to entry N–1). Each entry is configured to store a value. Also shown in FIG. 1 is a start pointer storage 14 which stores a start pointer. Additionally, a search value 18 is provided. Search value 18 is the value being searched for within rotating pointer buffer 10. Start pointer storage 14 is coupled to a first hit scanning circuit 20, which is further coupled to receive the output of a plurality of comparators 22A–22N as a set of raw hits signals on raw hits lines 24. Each comparator 22A–22N is coupled to a respective entry 12A–12N and to receive search value 18. First hit scanning circuit 20 is configured to generate a first hit indication on first hit lines 26 in response to the start pointer and the raw hits signals.

Generally speaking, first hit scanning circuit 20 scans the raw hits signals to determine a first hit (i.e. the first entry which matches search value 18). The start pointer identifies an entry (as illustrated by arrow 16) within rotating buffer pointer 10 at which searching for a search value 18 is to be initiated. In other words, the entry indicated by the start pointer is the entry which, if the value stored therein matches the search value, is the entry which is to be identified as the first hit in the buffer. From the entry indicated by the start pointer (the "starting entry"), the search continues with the entry which is (i) contiguous to the starting entry and (ii) storing the value which is next in order with the value stored in the starting entry. For example, if a search for the oldest matching entry is desired, the start pointer is the head pointer and entries are searched from the oldest forward. If a search for the newest matching entry is desired, the start pointer is the tail pointer and entries are searched from the newest backward. Since the first hit scanning technique may be applied to either type of searching, the remainder of this disclosure will use the terms "above" and "below" to refer to portions of the buffer. The entries which are "below" the start pointer are logically searched prior to the entries which are "above" the start pointer. For example, if searching for the newest matching entry is being performed, entries "below" the start pointer are storing values which are newer than entries "above" the start pointer. While searching the entries 12A–12N is logically ordered, the searching may actually be performed in parallel.

First hit scanning circuit 20 employs a parallel scanning method in which subsets of the raw hits signals are independently scanned to determine a first hit within each subset. Independently, a lookahead signal is generated for each subset. The lookahead signal identifies whether or not any of the raw hits signals within the subset indicate a hit. The lookahead signals for each subset are grouped and scanned as well, thereby identifying a first lookahead signal within each grouping which indicates that at least one of the corresponding subset of raw hits signals indicates a hit. The scanned lookahead signals are then used to qualify the corresponding subset of raw hits. The term "qualify", as used herein, refers to modifying the value of a first signal based upon the value of a second signal. If the second signal is in one state, the first signal is passed through the qualification unmodified. If the signal is in a second state, the first signal is set to a predefined state.

By dividing the raw hits signals into multiple subsets and scanning the subsets independently, and by scanning the subsets for at least one hit indication in parallel, the loading on any one given signal line may be reduced. Advantageously, first hit scanning circuit 20 may be capable of determining a first hit more rapidly than conventional first hit scanning circuits. The more rapid determination may allow for higher frequency operation of rotating pointer buffer 10, or may allow for additional logic to operate within a given clock cycle time.

Comparators 22A–22N compare the search value to the value stored in the corresponding entry 12A–12N. Each comparator 22 provides a comparison signal output. The comparison signal may be either a hit state or a miss state. The hit state indicates that search value 18 and the value within the corresponding entry 12A–12N match, while the miss state indicates that search value 18 and the value within the corresponding entry 12A–12N do not match. For example, each comparison signal might comprise a bit which indicates the hit state when set and the miss state when clear. Comparators 22A–22N may additionally include validity of the entry in the comparison (i.e. if the corresponding entry is not storing a valid value, the comparator indicates miss).

First hit scanning circuit 20 receives the set of comparison signals from comparators 22A–22N as the set of raw hits signals. The raw hits signals simply indicate whether or not each entry is storing a matching value. The raw hits signals are therefore scanned to determine which entry is first in order to generate the first hit indication on first hit lines 26. In one embodiment, the first hit indication comprises a signal for each entry. One signal indicates the corresponding entry is the first hit (e.g. by being set), and other signals indicate that the corresponding entry is not the first hit (e.g. by being clear).

It is noted that other circuitry (not shown) may be used for allocating and deallocating entries to store input values and for performing other desired functions with respect to rotating pointer buffer 10.

Figure 2:
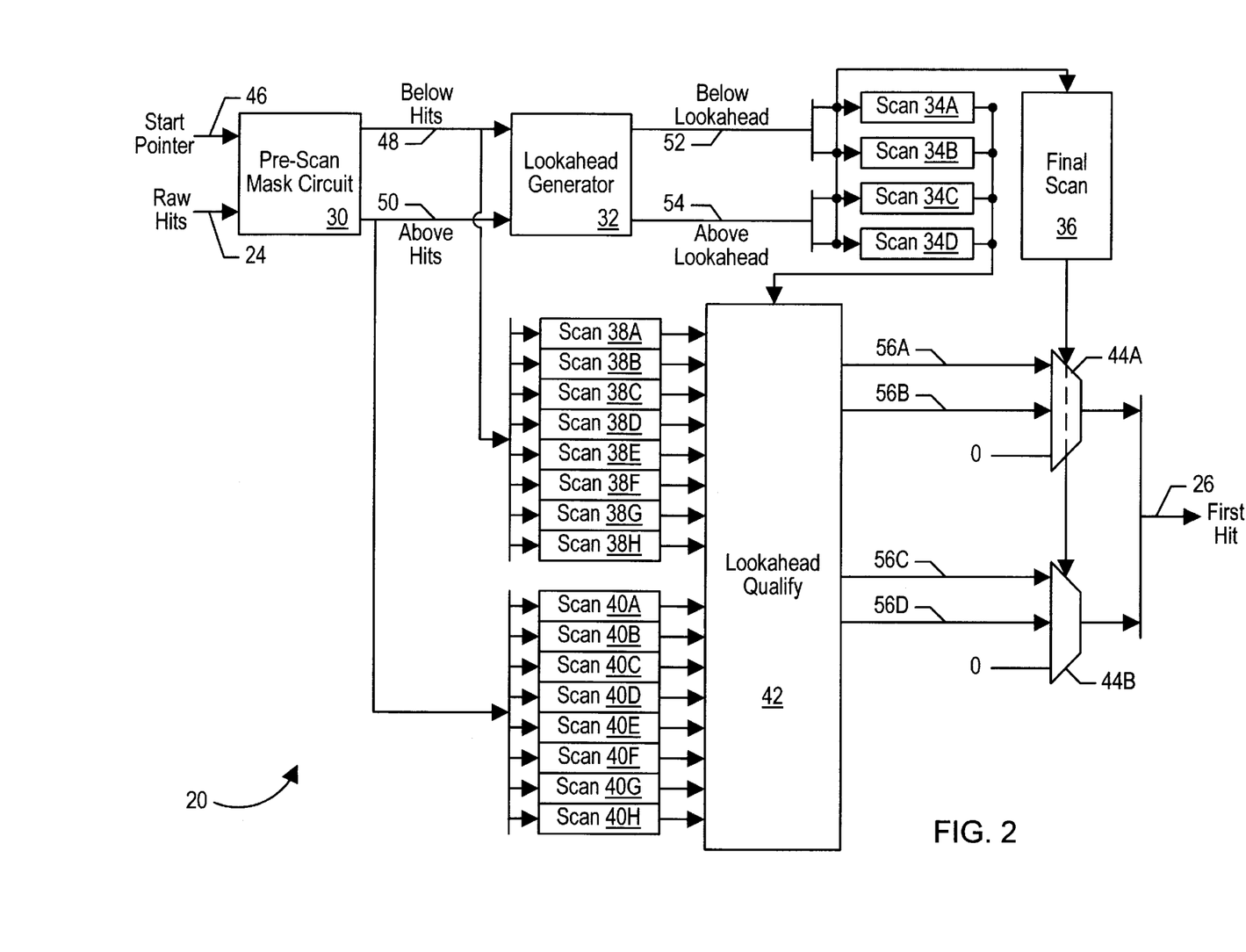
FIG. 2 is a block diagram of one embodiment of the first hit scanning circuit shown in FIG. 1.

Turning now to FIG. 2, a block diagram of one embodiment of first hit scanning circuit 20 is shown. Other embodiments are possible and contemplated. As shown in FIG. 2, first hit scanning circuit 20comprises a pre-scan mask circuit 30, a lookahead generator 32, a first set of scan circuits 34A–34 D, a final scan circuit 36, a second set of scan circuits 38A–38H, a third set of scan circuits 40A–40H, a lookahead qualify circuit 42, and multiplexors (muxes) 44A–44B. Pre-scan mask circuit 30 is coupled to receive the start pointer upon start pointer lines 46 from start pointer storage 14 and raw hits lines 24 from comparators 20A–20N. Pre-scan mask circuit 30 is configured to generate a set of below hits signals on below hits lines 48 and a set of above hits signals on above hits lines 50, which are provided to lookahead generator 32. Below hits lines 48 are coupled to scan circuits 38A–38H, while above hits lines 50 are coupled to scan circuits 40A–40H. Lookahead generator 32 generates a set of below lookahead signals on below lookahead lines 52 and a set of above lookahead signals on above lookahead lines 54 in response to the below hits signals and the above hits signals, respectively. The below lookahead lines 52 and above lookahead lines 54 are coupled to scan circuits 34A–34D and to final scan circuit 36 as shown in FIG. 2. Scan circuits 34A–34D, 38A–38H, and 40A–40H each provide a scan value to lookahead qualify circuit 42. Lookahead qualify circuit 42 provides qualified scan values 56A–56D to muxes 44A–44B. Muxes 44A–44B, under control from final scan circuit 36, select from qualified scan values 56A–56D and from a zero input to provide upper and lower portions of the first hit indication on first hit lines 26.

For the remainder of this disclosure, each comparison signal will be assumed to be a bit which, when set, indicates a hit state and, when clear, indicates a miss state for ease of description and understanding. Other encodings are possible and contemplated within the scope of the claims.

Pre-scan mask circuit 30 masks the raw hits signals to generate two masked sets of comparison signals. The below hits signals comprise the raw hits signals masked for each entry between the starting entry and entry 12A (i.e. each signal corresponding to an entry 12A–12N between the starting entry and the upper end of rotating pointer buffer 10 as shown in FIG. 1 (i.e. entry 12A) is reset). Hence, the below hits signals indicate which entries below the entry indicated by the start pointer are storing search value 18. In this manner, the below hits signals can be scanned from the signal indicating entry 12A to the signal indicated entry 12N, and the first hit below the start pointer within the buffer can be detected since none of the below hit signals corresponding to entries between the starting entry and entry 12A are set.

Additionally, pre-scan mask circuit 30 generates the above hits signals. Logically, the above hits signals comprise the raw hits signals masked for each entry between the starting entry and the lower end of rotating pointer buffer 10 (i.e. entry 12N). However, as will be described in more detail below, detecting a hit in the below hits signals takes precedence over a hit in the above hits signals. In other words, the above hits signals are a don't care if the below hits signals include at least one set signal. Therefore, the above hits signals may simply comprise the raw hits signals without masking. Alternatively, the above hits signals may be masked if desired.

The below hits signals are divided into subsets, and each subset is provided to a different scan circuit 38A–38H. Similarly, the above hits signals are divided into subsets and each subset is provided to a different scan circuit 40A–40H. In the present embodiment, 8 subsets are selected although any number of subsets may be selected according to the number of entries in buffer 10 and the number of signals to be scanned as a subset. In the present embodiment, each subset comprises 4 signals, allowing for logic gates within scan circuits 38A–38H and 40A–40H to have relatively few inputs. Logic gates having large numbers inputs are often realized using several cascaded levels of logic, slowing the scanning process. Again, subsets may be selected as having any number of signals, as desired. The present embodiment is therefore configured for a buffer 10 including 32 entries 12A–12N. Other numbers of entries may be supported by other embodiments.

Each scan circuit 38A–38H and 40A–40H scans the subset of signals provided thereto to identify the first signal which is set (i.e. in the hit state). The first signal which is set is that signal which is set and no signals within the subset which correspond to entries nearer entry 12A then the entry corresponding to the first signal are set. The scan circuits each provide a scan value identifying the first signal. If no signals within the subset are set, then the scan value does not identify any of the signals within the subset as being the first signal. In one embodiment, the scan value comprises the same number of signals as the scan circuit 38A–38H and 40A–40H receives. The first signal is identified by the corresponding signal within the scan value being set, and the remaining signals are clear. Concatenating the scan values provided by scan circuits 38A–38H provides a set of signals equal in number to the below hits signals, with at most one set signal per subset. Similarly, concatenating the scan values provided by scan circuits 40A–40H provides a set of signals equal in number to the above hits signals, with at most one set signal per subset.

In parallel with scan circuits 38A–38H and 40A–40H, lookahead generator circuit 32 generates a lookahead signal for each subset within the below hits signals and within the above hits signals. The lookahead signal indicates whether or not at least one signal within the corresponding subset is set. For example, the lookahead signal, if set, may indicate that at least one signal within the corresponding subset is set and, if clear, may indicate that none of the signals within the corresponding subset is set. The lookahead signals corresponding to subsets of the below hits signals are provided as the below lookahead signals and the lookahead signals corresponding to subsets of the above hits signals are provided as the above lookahead signals.

The below lookahead signals are divided into subsets for scanning by scan circuits 34A–34B. Additionally, the above lookahead signals are divided into subsets for scanning by scan circuits 34C–34D. Similar to scan circuits 38A–38H and 40A–40H, scan circuits 34A–34D identify the first lookahead signal within each subset which is set (i.e. indicates that at least one signal within the corresponding subset is set). The order for scanning the lookahead signals is the same as the order for scanning the signals within a subset (i.e. the lookahead signal corresponding to the subset containing entry 12A is highest priority, followed by the lookahead signal corresponding to the next subset of entries, etc.).

As shown in FIG. 2, two subsets of the below lookahead signals and two subsets of the above lookahead signals are scanned independently. One of the subsets of the below lookahead signals corresponds to the upper half of buffer 10, and the other of the subsets of the below lookahead signals corresponds to the lower half of buffer 10. The subsets of the above lookahead signals similarly correspond to the upper and lower halves of buffer 10. Therefore, at most one subset within the subsets corresponding to the upper half of buffer 10 and at most one subset corresponding to the subsets within the lower half of buffer 10 are indicated as containing the first hit via the scanned set of below lookahead signals. Similarly, at most one subset within the subsets corresponding to the upper half of buffer 10 and at most one subset corresponding to the subsets within the lower half of buffer 10 are indicated as containing the first hit via the scanned set of above lookahead signals.

The scan values produced by scan circuits 34A–34D are provided to lookahead qualify circuit 42. Each scanned lookahead signal is used to qualify the corresponding scanned subset of signals from scan circuits 38A–38H and 40A–40H. If the scanned lookahead signal indicates that the corresponding subset includes the first hit, the subset is passed through lookahead qualify circuit 42 unmodified. If the scanned lookahead signal indicates that the corresponding subset does not include the first hit, each signal within the subset is cleared (e.g. set to the miss state).

Since the scanned lookahead signals are scanned within subsets, the results provided by lookahead qualify circuit 42 may differ from the first hit indication desired. It is possible for one signal within each portion of the set of comparison signals corresponding to a subset of the lookahead signals scanned by scan circuits 34A–34D to remain set (i.e. in the hit state). Therefore, muxes 44A and 44B are used to select the first hit indication 26 from the output signals of lookahead qualify circuit 42.

Mux 44A receives the qualified scan values corresponding to scan circuits 38A–38D as qualified scan values 56A. Qualified scan values 56A are the qualified hit signals corresponding to the upper half of buffer 10 as masked to produce the below hits signals. Similarly, mux 44A receives the qualified scan values corresponding to scan circuits 40A–40D as qualified scan values 56B. Qualified scan values 56B are the qualified hit signals corresponding to the upper half of buffer 10 as masked to produce the above hits signals. Mux 44B receives qualified scan values corresponding to scan circuits 38E–38H as qualified scan values 56C and qualified scan values corresponding to scan circuits 40E–40H as qualified scan values 56D. Additionally, each mux 44A–44B includes a zero input (i.e. a set of scan values indicating miss).

Final scan circuit 36 generates mux controls for muxes 44A–44B based upon the below lookahead signals and the above lookahead signals. If final scan circuit 36 detects one of the below lookahead signals corresponding to a subset of entries within the upper half of buffer 10 is set, then final scan circuit 36 directs mux 44A to select qualified scan values 56A and mux 44B to select zero. On the other hand, if none of the below lookahead signals corresponding to a subset of entries within the upper half of buffer 10 is set and one of the below lookahead signals corresponding to a subset of entries within the lower half of buffer 10 is set, final scan circuit 36 directs mux 44A to select zero and mux 44B to select qualified scan values 56C. If none of the below lookahead signals are set and one of the above lookahead signals corresponding to a subset of entries within the upper half of buffer 10 is set, then final scan circuit 36 is configured to direct mux 44A to select qualified scan values 56B and mux 44B to select zero. If none of the below lookahead signals are set, none of the above lookahead signals corresponding to a subset of entries within the upper half of buffer 120 is set, and one of the above lookahead signals corresponding to a subset of entries within the lower half of buffer 10 is set, mux 44A is direct to select zero and mux 44B is directed to select qualified scan values 56D. Finally, if none of the below lookahead signals are set and none of the above lookahead signals are set, final scan circuit 36 directs both of muxes 44A and 44B to select zero (i.e. there is no hit for the search value).

It is noted that scan circuits 34A–34D may be configured similarly to scan circuits 38A–38H and scan circuits 40A–40H, since the same number of signals are provided to each of the circuits and the first set value is being scanned for. Advantageously, one scan circuit may be designed for use as each of scan circuits 34A–34D, 38A–38H, and 40A–40H.

Figure 3:
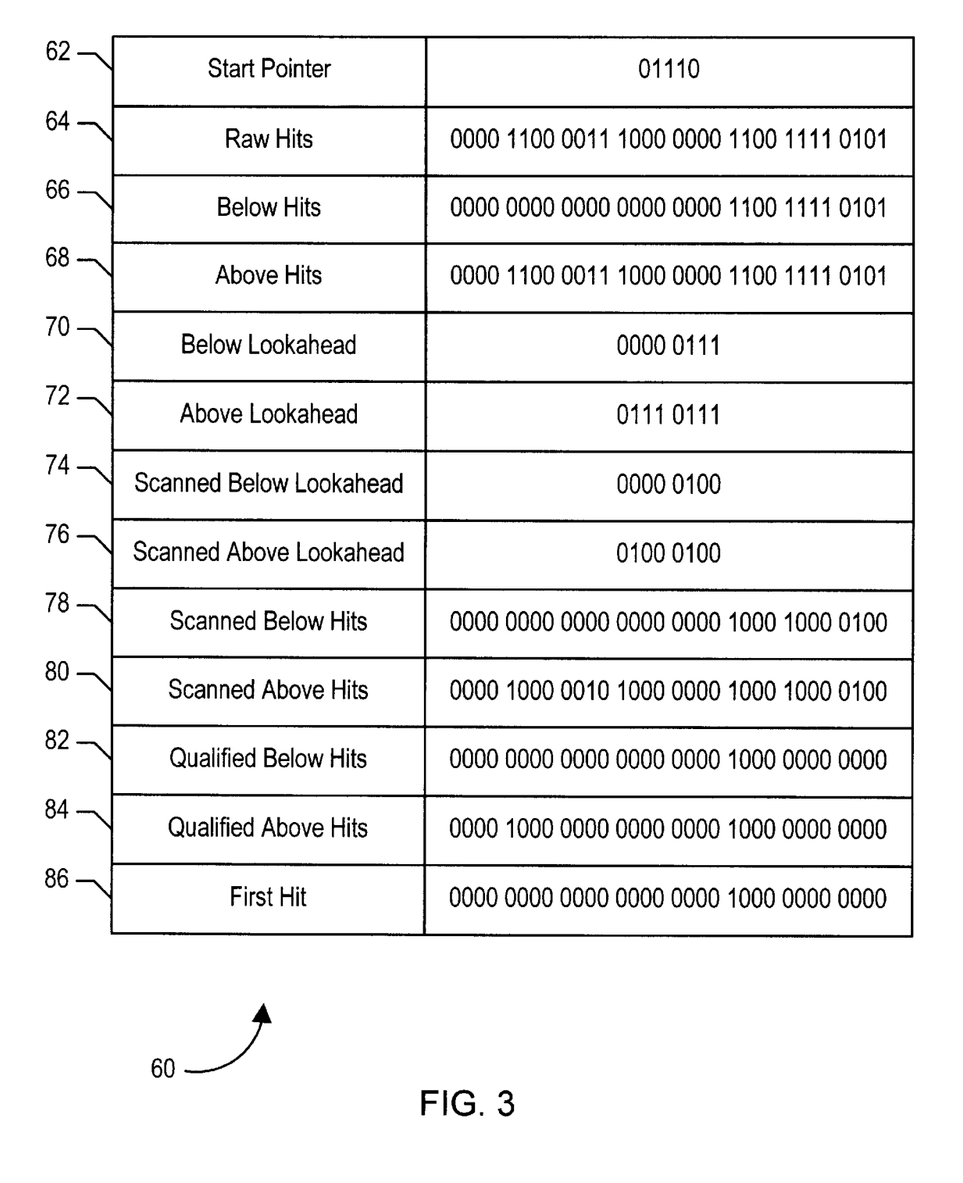
FIG. 3 is an example of values illustrated at various points within FIG. 2.

Turning now to FIG. 3, a table 60 is shown listing values at various points within the embodiment of first hit scanning circuit 20 as shown in FIG. 2 for an example of the operation of first hit scanning circuit 20. The example in FIG. 3 is for a 32 entry buffer in which subsets of the hit signals are four signals each. For the hit and lookahead signal values, the value which is left-most as shown in FIG. 3 corresponds to entry 12A (or the subset including the signal corresponding to entry 12A, for the lookahead signal values). Corresponding signals are then shown in order to the right until the right-most value corresponds to entry 12N (or the subset including the signal corresponding to entry 12N, for lookahead signal values). The subsets of hit signals and lookahead signals are delimited by spaces.

Table 60 lists the start pointer value (in binary) for the example, followed by the exemplary set of raw hits signals (again, in binary, with a bit being set indicating hit and a bit being clear indicating miss) (reference numerals 62 and 64, respectively). The start pointer indicates entry 14. Accordingly, entries 14–31 are the entries which are below the start pointer. As the raw hits entry in table 60 indicates, entries 4, 5, 10, 11, 12, 20, 21, 24, 25, 26, 27, 29, and 31 each are storing the search value in the present example.

Table 60 lists the below hits signals and above hits signals for the present example as well (reference numerals 66 and 68, respectively). The below hits signals correspond to the raw hits signals for each entry which is below the start pointer, and the below hits signals for each entry above the start pointer are reset. The above hits signals are equal to the raw hits signals, as mentioned above.

The below lookahead signals are shown in table 60 as well (reference numeral 70). Since the first five subsets of the below hits signals do not include any hit indications, each of the corresponding below lookahead signals are clear. The remaining three subsets of the below hits signals each include at least one hit. Therefore, the remaining three below lookahead signals are set. Similarly, the above lookahead signals are shown in table 60 (reference numeral 72). For each subset of the above hits signals which includes at least one hit, the corresponding above lookahead signal is set.

The below and above lookahead signals after scanning by scan circuits 34A–34D are shown at reference numerals 74 and 76, respectively. As these entries in table 60 illustrate, only the first lookahead signal within each subset of the lookahead signals remains set. Since the upper subset of the below lookahead signals does not include any set lookahead signals, the upper subset of the scanned below lookahead signals does not include any set lookahead signals either.

The scan values provided by scan circuits 38A–38H and 40A–40H are shown at reference numerals 78 and 80, respectively. A comparison of the below hit signals as shown at reference numeral 78 (i.e. subsequent to scanning by scan circuits 38A–38H) to the below hit signals at reference numeral 66 illustrates the selection of the first hit indication within each subset, and resetting of the subsequent hit indications. Similarly, the above hits signals at reference numeral 68 and the above hits signals after scanning at reference numeral 80 illustrates the identification of the first hit within each subset.

At reference numerals 82 and 84, the qualified above hits signals and below hits signals provided by lookahead qualify circuit 42. The left half of the qualified below hits signals shown at reference numeral 82 are qualified scan values 56A as shown in FIG. 2 for this example, while the right half of the qualified below hits signals shown at reference numeral 82 are qualified scan values 56C as shown in FIG. 2 for this example. Similarly, the left half of the qualified above hits signals shown at reference numeral 84 are qualified scan values 56B as shown in FIG. 2 for this example, while the right half of the qualified above hits signals shown at reference numeral 84 are qualified scan values 56D as shown in FIG. 2 for this example.

Finally, table 60 illustrates the first hit indication as selected by muxes 44A and 44B (reference numeral 86). Since none of the scanned below lookahead signals corresponding to the upper half of the buffer are set (see reference numeral 74), and one of the scanned below lookahead signals corresponding to the lower half of the buffer is set, zero is selected for the left half of the first hit value and the right half of the qualified below hits signals are selected as the right half of the first hit value. The first hit value identifies entry 20 as the first hit, which is the first raw hit below the entry indicated by the start pointer.

Figure 4:
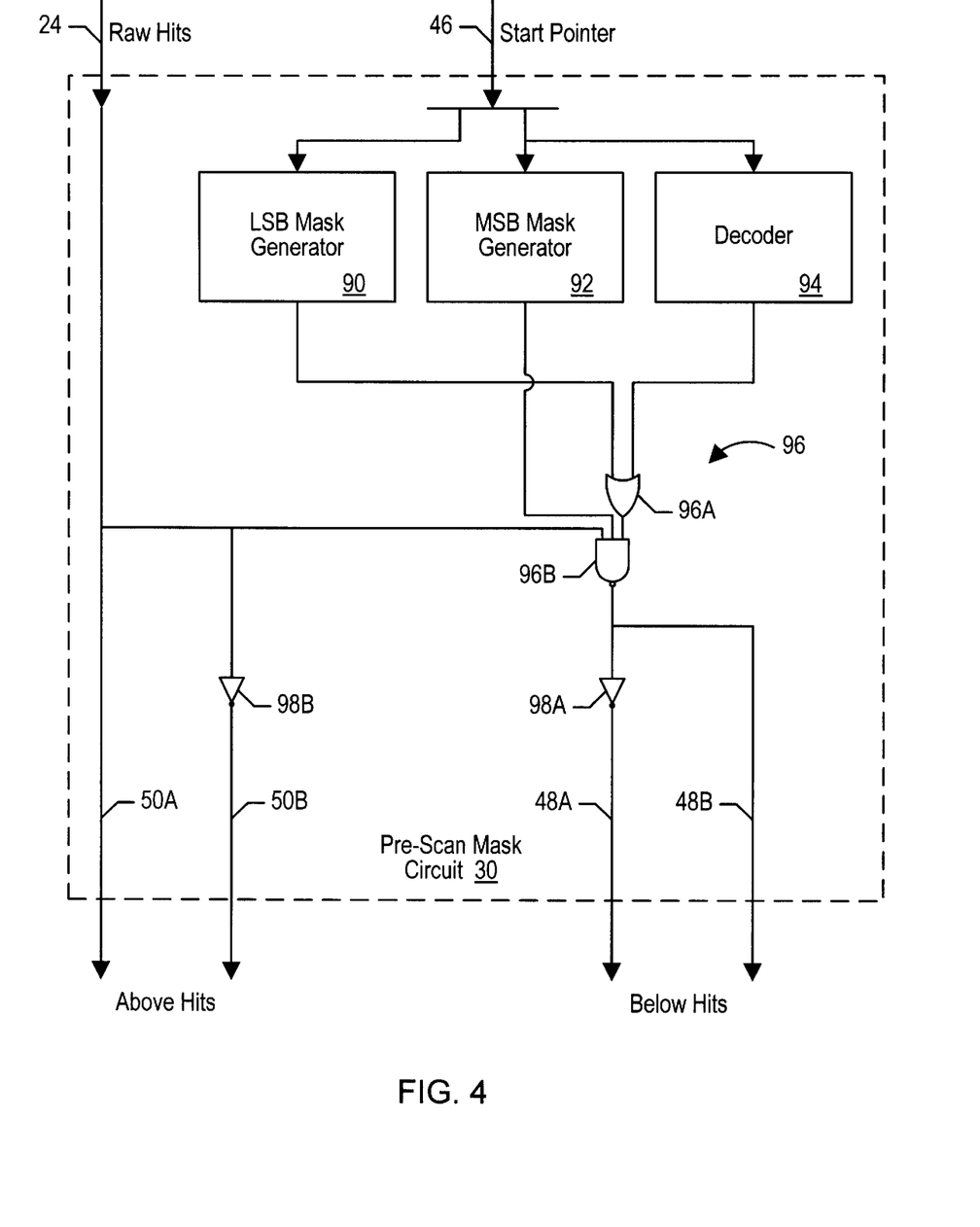
FIG. 4 is a block diagram of one embodiment of a pre-scan mask circuit shown in FIG. 2.

Turning now to FIG. 4, a block diagram of one embodiment of pre-scan mask circuit is shown. Other embodiments are possible and contemplated. In the embodiment of FIG. 4, pre-scan mask circuit 30 includes an LSB mask generator 90, an MSB mask generator 92, and a decoder 94. Furthermore, a set of logic gates 96 are shown.

LSB mask generator 90, MSB mask generator 92, decoder 94, and logic gates 96 are used to generate the below hits signals. The above hits signals are set equal to the raw hits signals. Using inverters 98A and 98B, both an inverted set of below hits signals and above hits signals (lines shown at reference numerals 48B and 50B, respectively) and a non-inverted set of below hits signals and above hits signals (lines shown at reference numerals 48A and 50A, respectively). The inverted set of signals are passed to lookahead generator 32, while the non-inverted set of signals are passed to scan circuits 38A–38H and 40A–40H.

LSB mask generator 90 receives a number of least significant bits of the start pointer. The number of least significant bits is dependent upon the number of hit signals which are included in a subset. In one embodiment, four signals are included in a subset and LSB mask generator 90 receives the two least significant bits of the start pointer. LSB mask generator 90 generates a mask having ones for each signal within the subset which is below the signal indicated by the least significant bits of the start pointer or is that signal, and zeros for the each signal above the signal indicated by the start pointer. LSB mask generator 90 is used to mask the subset of signals corresponding to the subset of entries including the entry indicated by the start pointer. Signals within that particular subset which are above the start pointer are masked off (i.e. set to the miss state), while signals which are below the start pointer should remain in the state indicated by comparator circuits 22.

MSB mask generator 92 receives the bits of the start pointer not received by LSB mask generator 90 MSB mask generator 92 generates a mask having a bit for each subset of signals. The bit is set if the subset corresponds to a subset of entries below the starting entry or including the starting entry, and is clear if the subset corresponds to a group of entries above the starting entry. The mask generated by MSB mask generator 92 is used to mask off the subsets of signals corresponding to subsets of entries which are above the start pointer.

Decoder 94 decodes the most significant bits of the start pointer to identify the subset containing the start pointer. The output of decoder 94, in combination with the mask generated by LSB mask generator 90, is used to mask the subset of signals including the signal corresponding to the starting entry, as described above. For the embodiment shown in FIG. 4, decoder 94 produces an inverted decode having a set bit for each subset except for the subset including the signal corresponding to the starting entry.

Logic gates 96 receive the outputs of LSB mask generator 90, MSB mask generator 92, decoder 94, and receive the raw hits signals. An OR gate 96A and a NAND gate 96B are shown, and these gates are used to generate a particular one of the below hits signals. For clarity, all of the logic gates 96 which are used are not shown. However, a set of gates similar to 96A and 96B are used for each of the raw hits signals to generate corresponding below hits signals.

OR gate 96A receives the bit from decoder 94 which corresponds to the subset in which the particular signal is included, and receives the bit from the mask generated by LSB mask generator 90 which corresponds to the position of the particular signal within the subset. If the particular signal is within the subset including the signal corresponding to the starting entry, then the bit from LSB mask generator 90 determines the output of OR gate 96A. On the other hand, if the particular signal is not within the subset including the signal corresponding to the starting entry, the output of OR gate 96A is a binary one. In this manner, the mask generated by LSB mask generator 90 affects the particular signal only if the particular signal is within the subset including the signal corresponding to the starting entry.

The output of OR gate 96A is an input to NAND gate 96B, along with the bit from MSB mask generator 92corresponding to the subset which includes the particular signal and the raw hits signal corresponding to the particular signal. If the bit from mask generator 92 is set and the output of OR gate 96A is a binary one, the state of the corresponding raw hits signal is passed through NAND gate 96B. Otherwise, the state of the corresponding raw hits signal is masked off (i.e. set to a miss state, or cleared in the embodiment of FIG. 2).

Accordingly, the particular raw hits signal is masked off by logic gates 96 if: MSB mask generator 92 indicates that the subset of raw hits signals including the particular raw hits signal is above the subset including raw hits signal corresponding to the starting entry, or the particular raw hits signal is within the subset including the signal corresponding to the starting entry and the corresponding bit of the mask generated by LSB mask generator 90 indicates that the particular raw hits signal corresponds to an entry above the starting entry.

Figure 5:
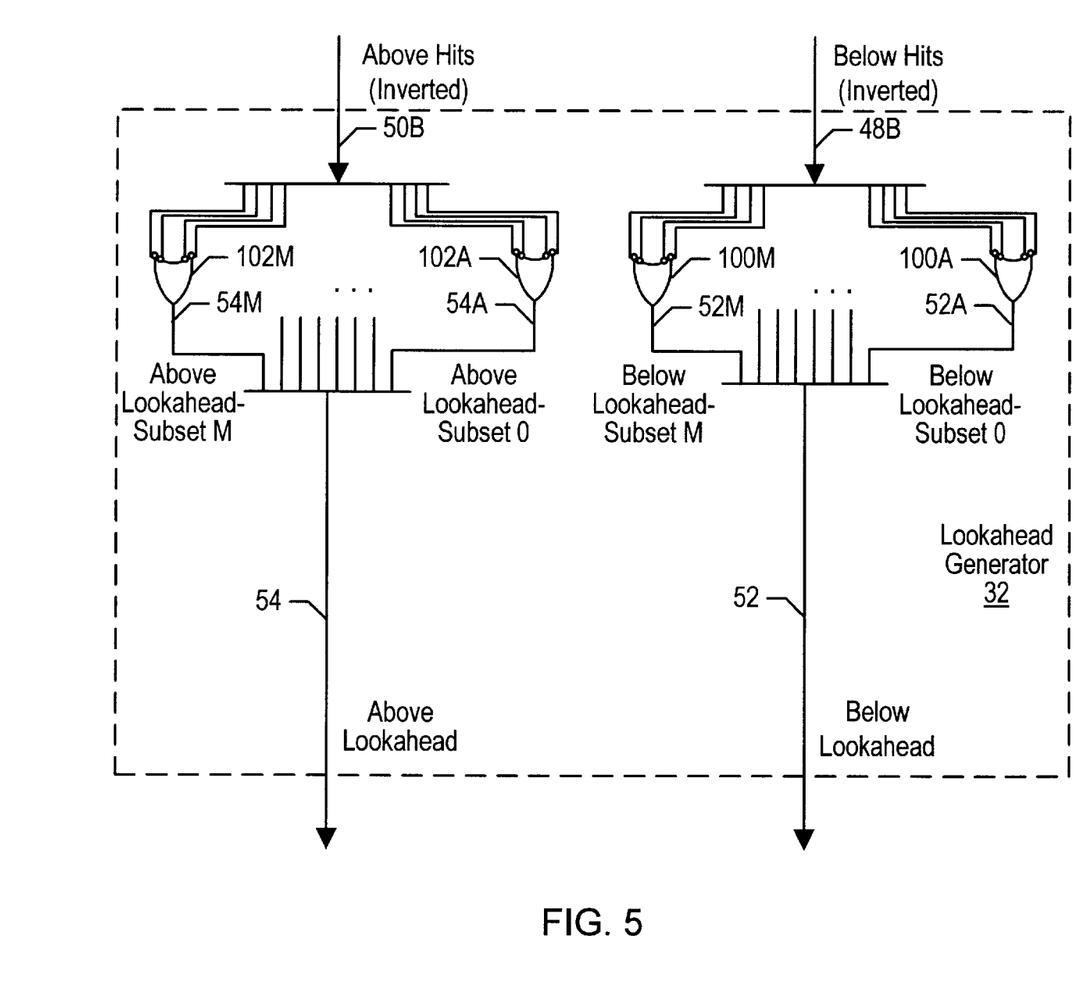
FIG. 5 is logic diagram of one embodiment of a lookahead generator shown in FIG. 2.

Turning next to FIG. 5, a logic diagram of one embodiment of lookahead generator 32 is shown. Other embodiments are possible and contemplated. Lookahead generator 32 generates a lookahead signal for each subset of the below hits signals and the above hits signals. Accordingly, a logic gate 100A is provided which identifies whether or not a signal within the first subset (subset 0, including the signal corresponding to entry 12A) of the below hits signals indicates a hit. Logic gate 100A provides the below lookahead signal for subset 0 (i.e. the line identified by reference numeral 52A). Similar logic gates are used to generate the below lookahead signals, including logic gate 100M which generates the below lookahead signal for subset M (i.e. the line identified by reference numeral 52M). Logic gates 100A–100M receive the inverted below hits signals 48B from pre-scan mask circuit 30. Similarly, logic gates 102A–102M generate above lookahead signals on lines 54A–54M from the inverted above hits signals on lines 50B. Accordingly, the above lookahead signals are generated.

Figure 6:
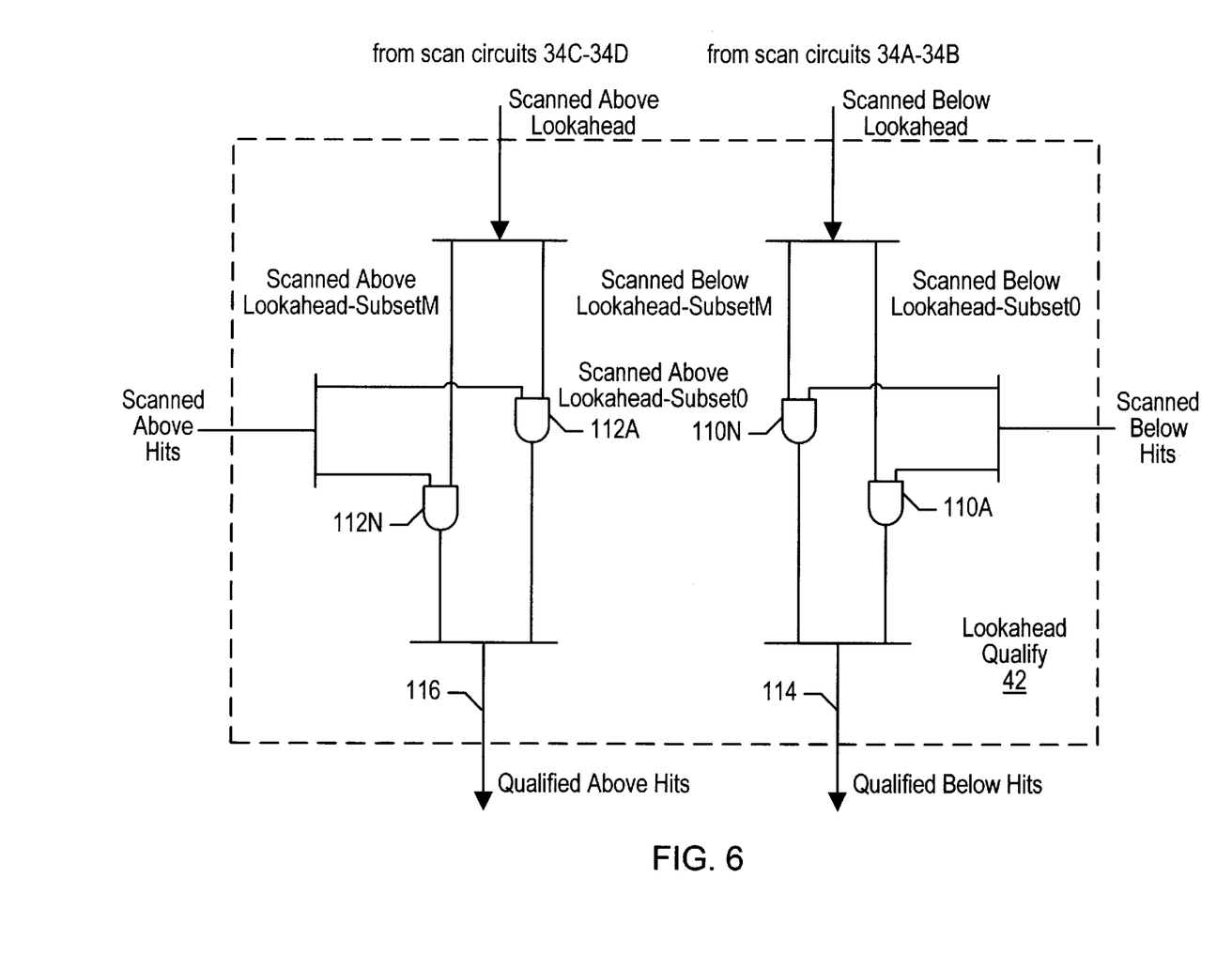
FIG. 6 is a logic diagram of one embodiment of a lookahead qualify circuit shown in FIG. 2.

FIG. 6 is a logic diagram of one embodiment of lookahead qualify circuit 42. Lookahead qualify circuit 42 receives the scanned below lookahead signals from scan circuits 32A–32B and the scanned above lookahead signals from scan circuits 32C–32D. Additionally, the scanned below hits signals from scan circuits 38A–38H and the scanned above hits signals from scan circuits 40A–40H are received by lookahead qualify circuit 42. Lookahead qualify circuit 42 qualifies each scanned below hits signal with the scanned below lookahead signal corresponding to the subset including that scanned below hits signal using a set of AND gates 110A–110N. One AND gate 110 is included for each scanned below hits signal, but for clarity only AND gates 110A and 110N are shown. For example, AND gate 110A qualifies the scanned below hits signal corresponding to entry 12A with the scanned below lookahead signal for subset 0. Similarly, AND gates 112A–112N are used to qualify each scanned above hits signal with the scanned above lookahead signal corresponding to the subset including that scanned above hits signal.

For the embodiment of FIG. 2, the half of qualified below hits signals on lines 114 corresponding to the upper half of buffer 10 comprise qualified scan values 56A, while the remaining half of qualified below hits signals on lines 114 comprise qualified scan values 56C. Similarly, the half of qualified above hits signals on lines 116 corresponding to the upper half of buffer 10 comprise qualified scan values 56B, while the remaining half of qualified above hits signals on lines 116 comprise qualified scan values 56D.

Figure 7:
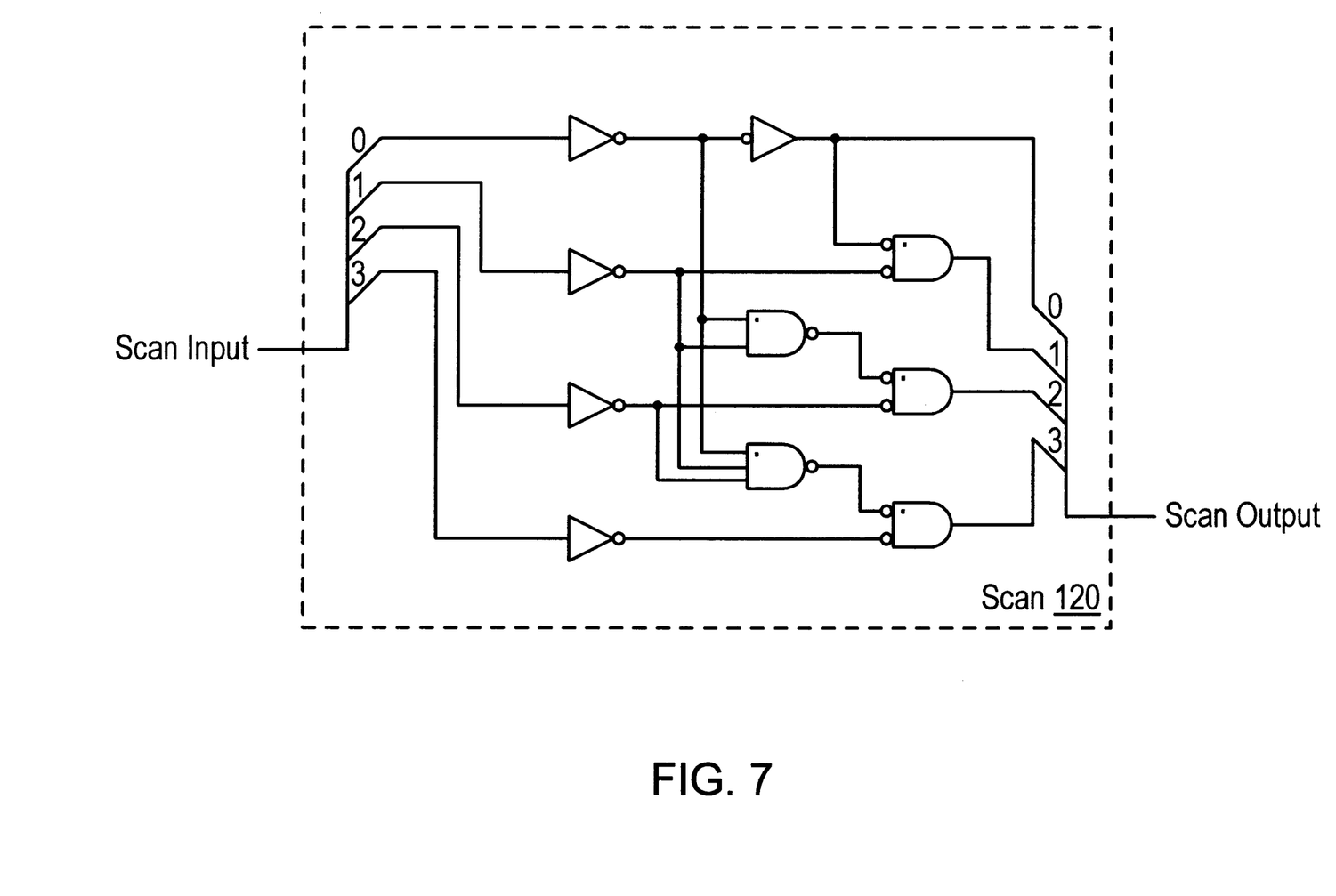
FIG. 7 is a logic diagram of one embodiment of a scan circuit shown in FIG. 2.

FIG. 7 is a logic diagram illustrating one embodiment of a scan circuit 120. Other embodiments are possible and contemplated. Scan circuit 120 may be used as any of scan circuits 32A–32D, 38A–38H, and 40A–40H.

Figure 8:
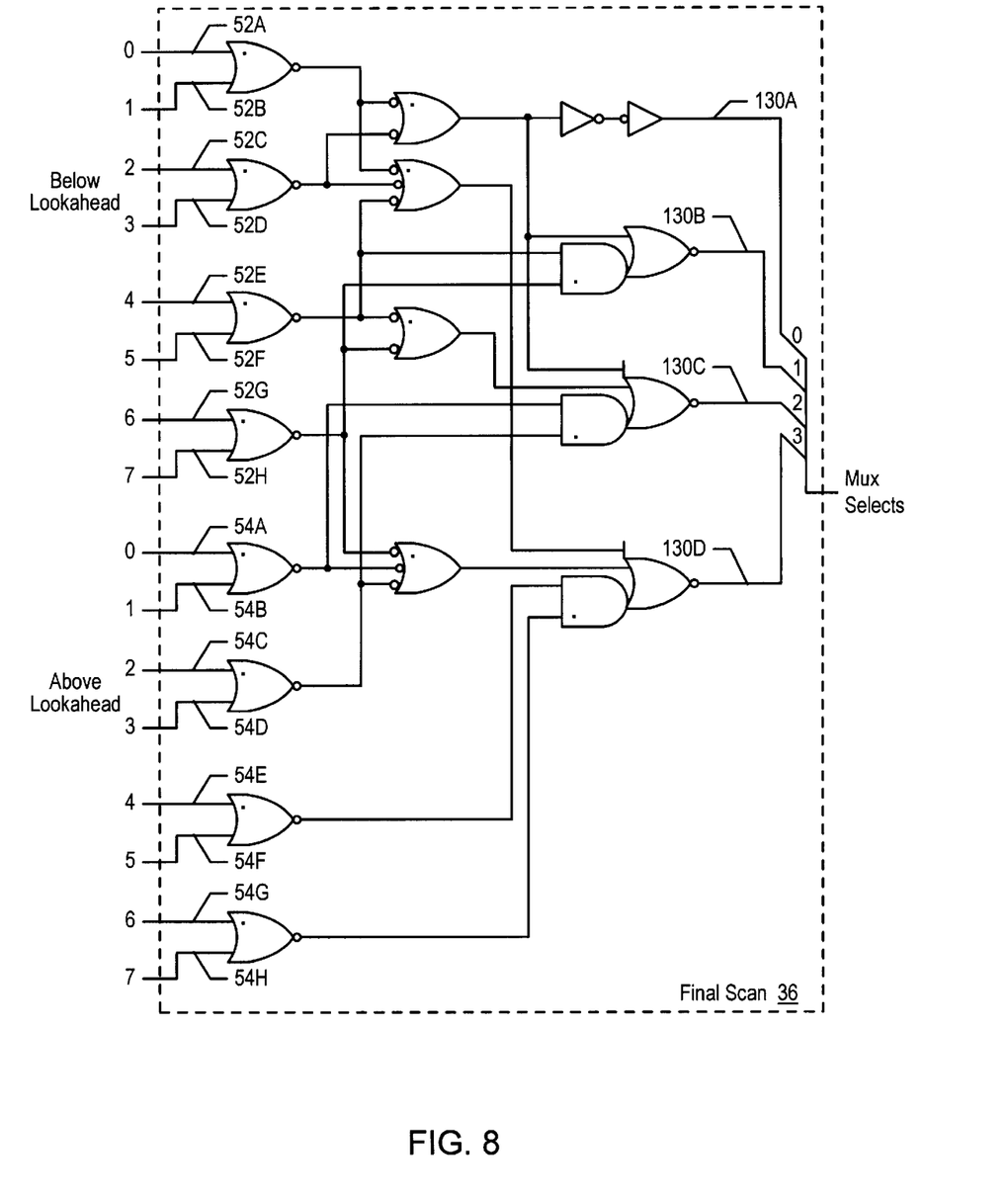
FIG. 8 is a logic diagram of one embodiment of a final scan circuit shown in FIG. 2.

FIG. 8 is a logic diagram of one embodiment of final scan circuit 36 is shown. Other embodiments are possible and contemplated. As shown in FIG. 8, final scan circuit 36 receives the below lookahead signals on lines 52 (e.g. the below lookahead signal for subset 0 on line 52A, the below lookahead signal for subset 1 on line 52B, etc. through the below lookahead signal for subset 7 on line 52H). Additionally, final scan circuit 36 receives the above lookahead signals on lines 54 (e.g. the above lookahead signal for subset 0 on line 54A, the above lookahead signal for subset 1 on line 54B, etc. through the above lookahead signal for subset 7 on line 54H). Mux select signals on lines 130A, 130B, 130C, and 130D are thereby generated.

The mux select signal on line 130A, when asserted, causes mux 44A to select qualified scan values 56A and mux 44B to select zero. The mux select signal on line 130B, when asserted, causes mux 44A to select zero and mux 44B to select qualified scan values 56C. The mux select signal on line 130C, when asserted, causes mux 44A to select qualified scan values 56B and mux 44B to select zero. The mux select signal on line 130D, when asserted, causes mux 44A to select zero and mux 44B to select qualified scan values 56D. If none of mux select signals on lines 130A–130D are asserted, both muxes 44A–44B select zero.

In one particular embodiment, lookahead qualify circuit 42 uses NAND gates instead of AND gates, the mux select signals on lines 130A–130D are inverted, and muxes 44A–44B are implemented using OR gates to OR the mux select signals with the corresponding qualified scan values 56A–56D and AND gates to AND together the outputs of corresponding OR gates.

Figure 9:
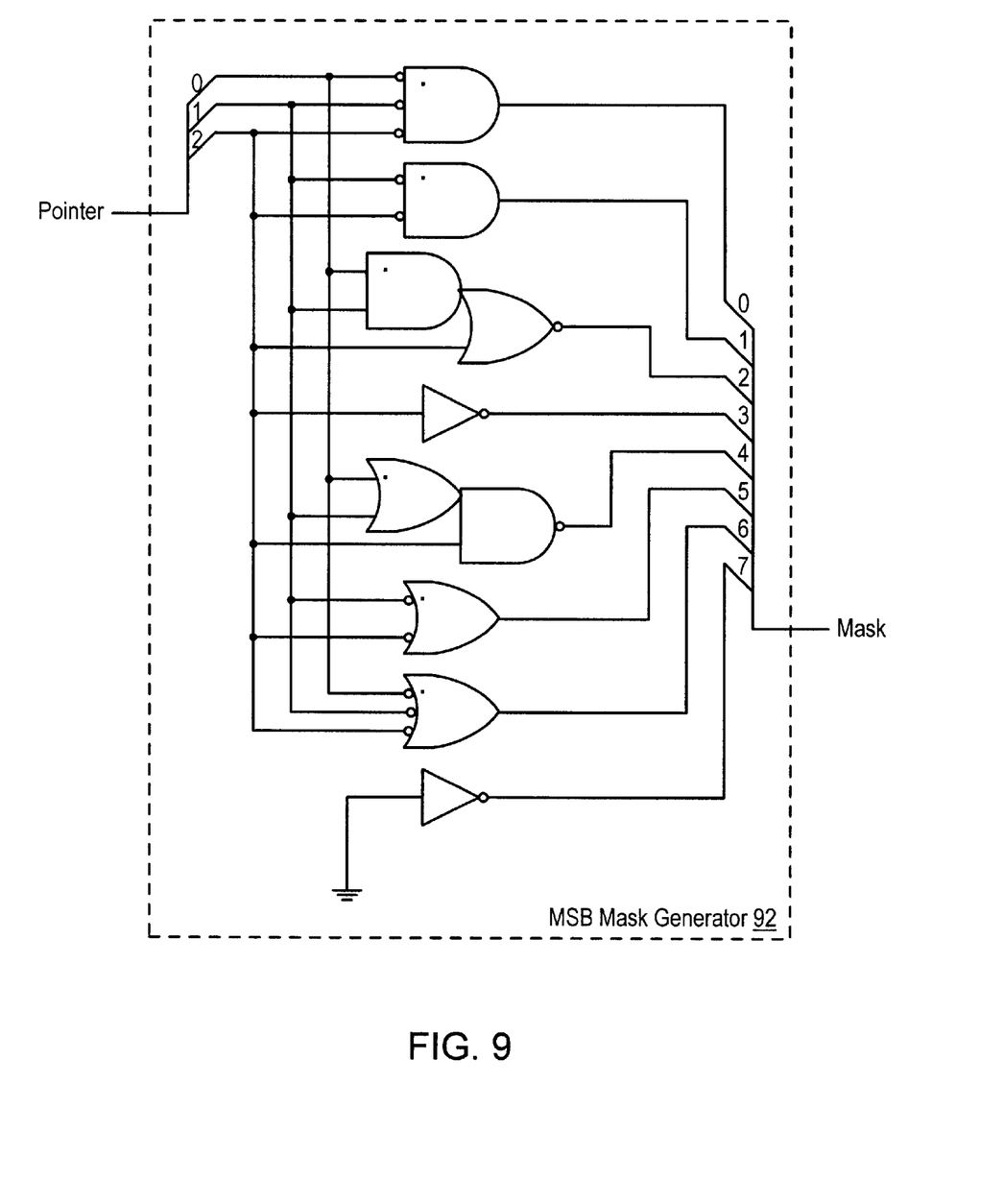
FIG. 9 is a logic diagram of one embodiment of an MSB mask generator shown in FIG. 4.
Figure 10:
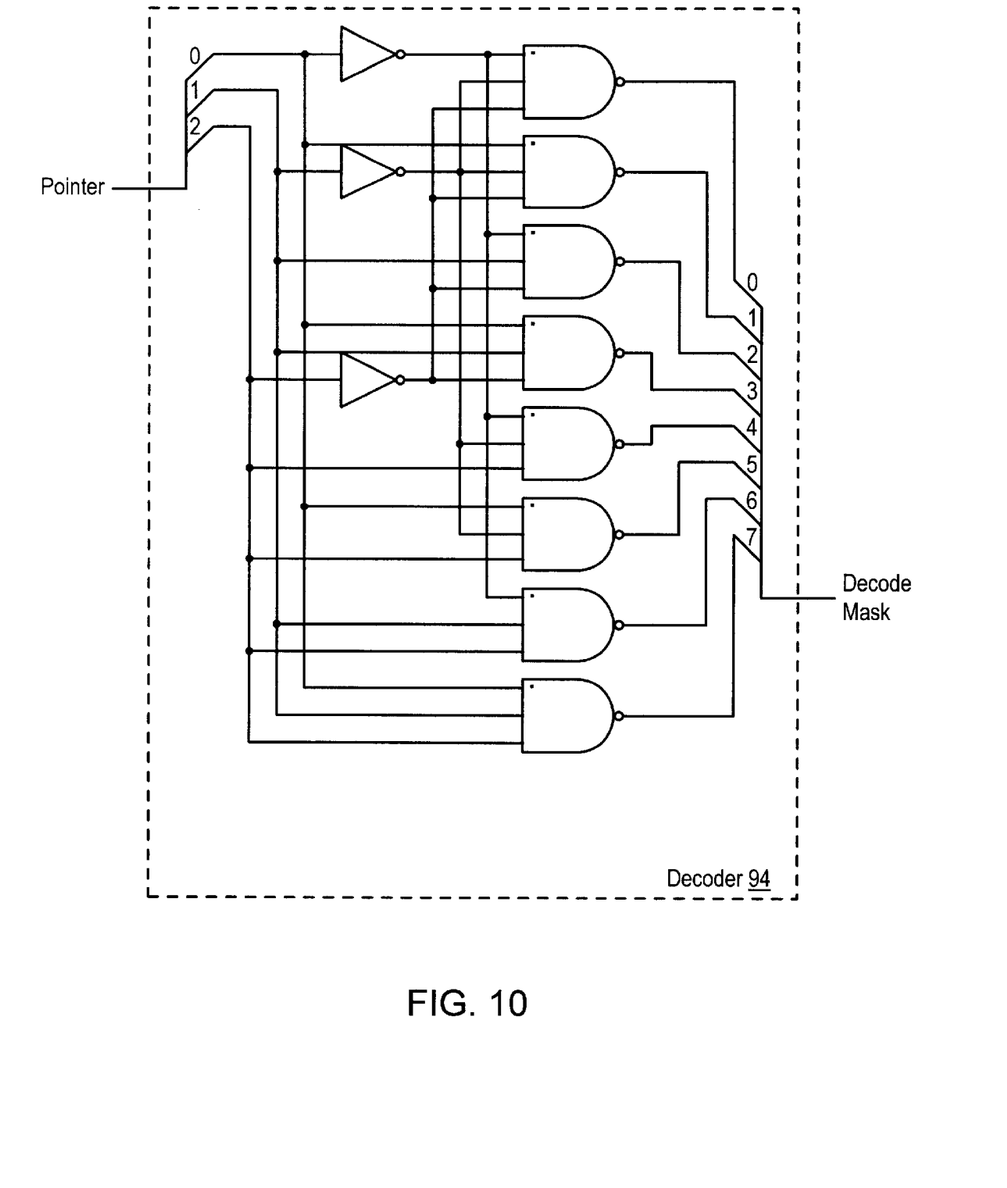
FIG. 10 is a logic diagram of one embodiment of a decoder shown in FIG. 4.

FIG. 9 is a logic diagram of one embodiment of MSB mask generator 92. Other embodiments are possible and contemplated. Similar logic may be used to for LSB mask generator 90 as well (using two bits to generate a four bit mask, according to one embodiment). FIG. 10 is a logic diagram of one embodiment of decoder 94.

In accordance with the above disclosure, a first hit scanning circuit has been shown which scans hit information in multiple subsets, and in parallel generates lookahead information indicating which subsets include at least one hit. The scanned subset information is qualified with the lookahead information to generate the first hit. Advantageously, the scanning process is highly parallel, limiting the fanout and load on any given signal. An efficient and rapid scan may thereby be achieved.

Numerous variations and modifications will become apparent to those skilled in the art once the above disclosure is fully appreciated. It is intended that the following claims be interpreted to embrace all such variations and modifications.

What is claimed is:

1. A circuit for identifying a first entry within a rotating pointer buffer comprising a set of entries, said first entry storing a search value, said circuit comprising:

a mask circuit coupled to receive:

(i) a set of comparison signals corresponding to said set of entries, and wherein each of said set of comparison signals, in a hit state, indicates that a corresponding one of said set of entries is storing said search value, and wherein said each of said set of comparison signals, in a miss state, indicates that said corresponding one of said set of entries is not storing said search value; and         (ii) a start pointer indicating a particular one of said set of entries at which searching for said search value is initiated;

wherein said mask circuit is configured to generate a first masked set of comparison signals from said set of comparison signals, and wherein each of said first masked set of comparison signals for which said corresponding one of said set of entries is between said start pointer and a first end of said rotating pointer buffer is set to a miss state, and wherein said mask circuit is configured to generate a second masked set of comparison signals from said set of comparison signals;

a first set of scan circuits, wherein each of said first set of scan circuits is coupled to receive a different subset of said first masked set of comparison signals, and wherein each of said first set of scan circuits is configured to scan said different subset of said first masked set of comparison signals to generate one of a first set of scan values indicating a first one of said subset of said first masked set of comparison signals which is in said hit state;

a second set of scan circuits, wherein each of said second set of scan circuits is coupled to receive a different subset of said second masked set of comparison signals, and wherein each of said second set of scan circuits is configured to scan said different subset of said second masked set of comparison signals to generate one of a second set of scan values indicating a first one of said subset of said second masked set of comparison signals which is in said hit state;

a lookahead generator coupled to receive said first masked set of comparison signals and said second masked set of comparison signals, wherein said lookahead generator is configured to generate a first set of lookahead signals, wherein each of said first set of lookahead signals corresponds to a different one of said subsets of said first masked set of comparison signals, and wherein said each of said first set of lookahead signals is indicative, in a first state, that at least one of said first masked set of comparison signals within said different one of said subsets of said first masked set of comparison signals is in said hit state, and wherein said each one of said first set of lookahead signals is indicative, in a second state, that each one of said first masked set of comparison signals within said different one of said subsets of said first masked set of comparison signals is in said miss state, and wherein said lookahead generator is configured to generate a second set of lookahead signals, wherein each of said second set of lookahead signals corresponds to a different one of said subsets of said second masked set of comparison signals, and wherein said each of said second set of lookahead signals is indicative, in said first state, that at least one of said second masked set of comparison signals within said different one of said subsets of said second masked set of comparison signals is in said hit state, and wherein said each one of said second set of lookahead signals is indicative, in said second state, that each one of said second masked set of comparison signals within said different one of said subsets of said second masked set of comparison signals is in said miss state;

a third set of scan circuits, wherein each of said third set of scan circuits is coupled to receive a different subset of said first set of lookahead signals, and wherein said third set of scan circuits is configured to generate a third set of scan values, and wherein each of said third set of scan values indicates a first one of said different subset of said first set of lookahead signals which is in said first state;

a fourth set of scan circuits, wherein each of said fourth set of scan circuits is coupled to receive a different subset of said second set of lookahead signals, and wherein said fourth set of scan circuits is configured to generate a fourth set of scan values, and wherein each of said fourth set of scan values indicates a first one of said different subset of said second set of lookahead signals which is in said first state;

a lookahead qualifying circuit coupled to receive said first set of scan values, said second set of scan values, said third set of scan values, and said fourth set of scan values, and wherein said lookahead qualifying circuit is configured to qualify said first set of scan values with said third set of scan values to produce a fifth set of scan values and to qualify said second set of scan values with said fourth set of scan values to produce a sixth set of scan values;

a final scan circuit coupled to receive said first set of lookahead signals and said second set of lookahead signals, wherein said final scan circuit is configured to scan said first set of lookahead signals to identify a first one of said first set of lookahead signals which is in said first state, and wherein said final scan circuit is configured to scan said second set of lookahead signals to identify a first one of said second set of lookahead signals which is in said first state if none of said first set of lookahead signals are in said first state, and wherein said final scan circuit is configured to select from said fifth set of scan values and said sixth set of scan values responsive to said scanning of said first set of lookahead signals and said second set of lookahead signals.

2. The circuit as recited in claim 1 wherein said final scan circuit is configured to select from said fifth set of scan values if at least one of said first set of lookahead signals is in said first state.

3. The circuit as recited in claim 2 wherein said final scan circuit is configured to select from said sixth set of scan values if at least one of said second set of lookahead signals is in said first state and each of said first set of lookahead signals is in said second state.

4. The circuit as recited in claim 3 wherein said final scan circuit is configured to select a set of signals in said miss state if each of said first set of lookahead signals are in said second state and each of said second set of lookahead signals are in said second state.

5. The circuit as recited in claim 1 wherein said final scan circuit is separately response to a first subset of said first set of lookahead signals and a second subset of said first set of lookahead signals, and wherein said final scan circuit is configured to select between a first subset of said fifth set of scan values and a first subset of said sixth set of scan values responsive to said first subset of said first set of lookahead signals, and wherein said final scan circuit is configured to select between a second subset of said fifth set of scan values and a second subset of said sixth subset of said scan values responsive to said second subset of said first set of lookahead signals.

6. The circuit as recited in claim 5 wherein said final scan circuit is separately response to a first subset of said second set of lookahead signals and a second subset of said second set of lookahead signals, and wherein said final scan circuit is configured to select between a first subset of said fifth set of scan values and a first subset of said sixth set of scan values responsive to said first subset of said second set of lookahead signals, and wherein said final scan circuit is configured to select between a second subset of said fifth set of scan values and a second subset of said sixth subset of said scan values responsive to said second subset of said second set of lookahead signals.

7. A method for identifying a first entry within a rotating pointer buffer comprising a set of entries, said first entry storing a search value, the method comprising:

masking, responsive to a start pointer indicative of a particular entry within said rotating pointer buffer at which searching for said search value is initiated, a set of comparison signals corresponding to said set of entries to generate a first masked set of comparison signals, wherein each of said set of comparison signals indicates, in a hit state, that a corresponding one of said set of entries is storing said search value, and wherein said each of said set of comparison signals is indicative, in a miss state, that said corresponding one of said set of entries is not storing said search value, and wherein each of said first masked set of comparison signals for which said corresponding one of said set of entries is between said start pointer and a first end of said rotating pointer buffer is set to a miss state;

independently scanning each of multiple subsets of said first masked set of comparison signals to generate a first set of scan values, wherein each of said first set of scan values corresponds to a different one of said multiple subsets of said first masked set of comparison signals, and wherein said each of said first set of scan values indicates a particular one of said first masked set of comparison signals within said different one of said multiple subsets of said first masked set of comparison signals which is in said hit state;

generating a first set of lookahead signals, wherein each one of said first set of lookahead signals corresponds to a different one of said multiple subsets of said first masked set of comparison signals, and wherein said each one of said first set of lookahead signals is indicative, in a first state, that at least one of said first masked set of comparison signals within said different one of said multiple subsets of said first masked set of comparison signals is in said hit state, and wherein said each one of said first set of lookahead signals is indicative, in a second state, that each one of said first masked set of comparison signals within said different one of said multiple subsets of said first masked set of comparison signals is in said miss state;

scanning said first set of lookahead signals to generate a second set of scan values, wherein each of said second set of scan values indicates a particular one of a corresponding subset of said first set of lookahead signals which is in said first state;

qualifying said first set of scan values with said second set of scan values to generate a third set of scan values;

scanning said second set of scan values to select a first one of said subsets of said first set of lookahead signals for which a corresponding one of said second set of scan values indicates at least one of said corresponding one of said subsets of first set of said lookahead signals is in said first state; and selecting an output value from said third set of scan values in response to said scanning said second set of scan values, thereby identifying said first entry.

8. The method as recited in claim 7, wherein a number of signals within said each of said multiple subsets of said first masked set of comparison signals is equal to a number of signals within said subsets of said lookahead signals.

9. The method as recited in claim 7 further comprising independently scanning each of multiple subsets of a second masked set of comparison signals corresponding to said set of comparison signals to generate a fourth set of scan values, wherein each of said fourth set of scan values corresponds to a different one of said multiple subsets of said second masked set of comparison signals, and wherein said each of said fourth set of scan values indicates a particular one of said second masked set of comparison signals within said different one of said multiple subsets of said second masked set of comparison signals which is in said hit state.

10. The method as recited in claim 9 wherein said second masked set of comparison signals is said set of comparison signals.

11. The method as recited in claim 9 wherein each of said second masked set of comparison signals for which a corresponding one of said set of entries is between said start pointer and a second end of said rotating pointer buffer is set to a miss state.

12. The method as recited in claim 9 further comprising generating a second set of lookahead signals, wherein each one of said second set of lookahead signals corresponds to a different one of said multiple subsets of said second masked set of comparison signals, and wherein said each one of said second set of lookahead signals is indicative, in said first state, that at least one of said second masked set of comparison signals within said different one of said multiple subsets of said second masked set of comparison signals is in said hit state, and wherein said each one of said second set of lookahead signals is indicative, in said second state, that each one of said second masked set of comparison signals within said different one of said multiple subsets of said second masked set of comparison signals is in said miss state.

13. The method as recited in claim 12 further comprising scanning said second set of lookahead signals to generate a fifth set of scan values, wherein each of said fifth set of scan values indicates a particular one of a corresponding subset of said second set of lookahead signals which is in said first state.

14. The method as recited in claim 13 further comprising qualifying said fourth set of scan values with said fifth set of scan values to generate a sixth set of scan values.

15. The method as recited in claim 14 further comprising scanning said fifth set of scan values to select a first one of said subsets of said second set of lookahead signals for which a corresponding one of said fifth set of scan values indicates at least one of said corresponding one of said subsets of second set of said lookahead signals is in said first state.

16. The method as recited in claim 15 further comprising selecting said output value from said sixth set of scan values in response to said scanning said fifth set of scan values, thereby identifying said first entry, if said third set of scan values does not indicate said first entry.

17. The method as recited in claim 7 wherein said particular one of said first masked set of comparison signals within said different one of said multiple subsets of said first masked set of comparison signals which is in said hit state is a first one of said first masked set of comparison signals within said different one of said multiple subsets of said first masked set of comparison signals which is in said hit state.

18. The method as recited in claim 17 wherein said particular one of said corresponding subset of said first set of lookahead signals which is in said first state is a first one of said corresponding subset of said first set of lookahead signals which is in said first state.

* * * * *